2,708,588

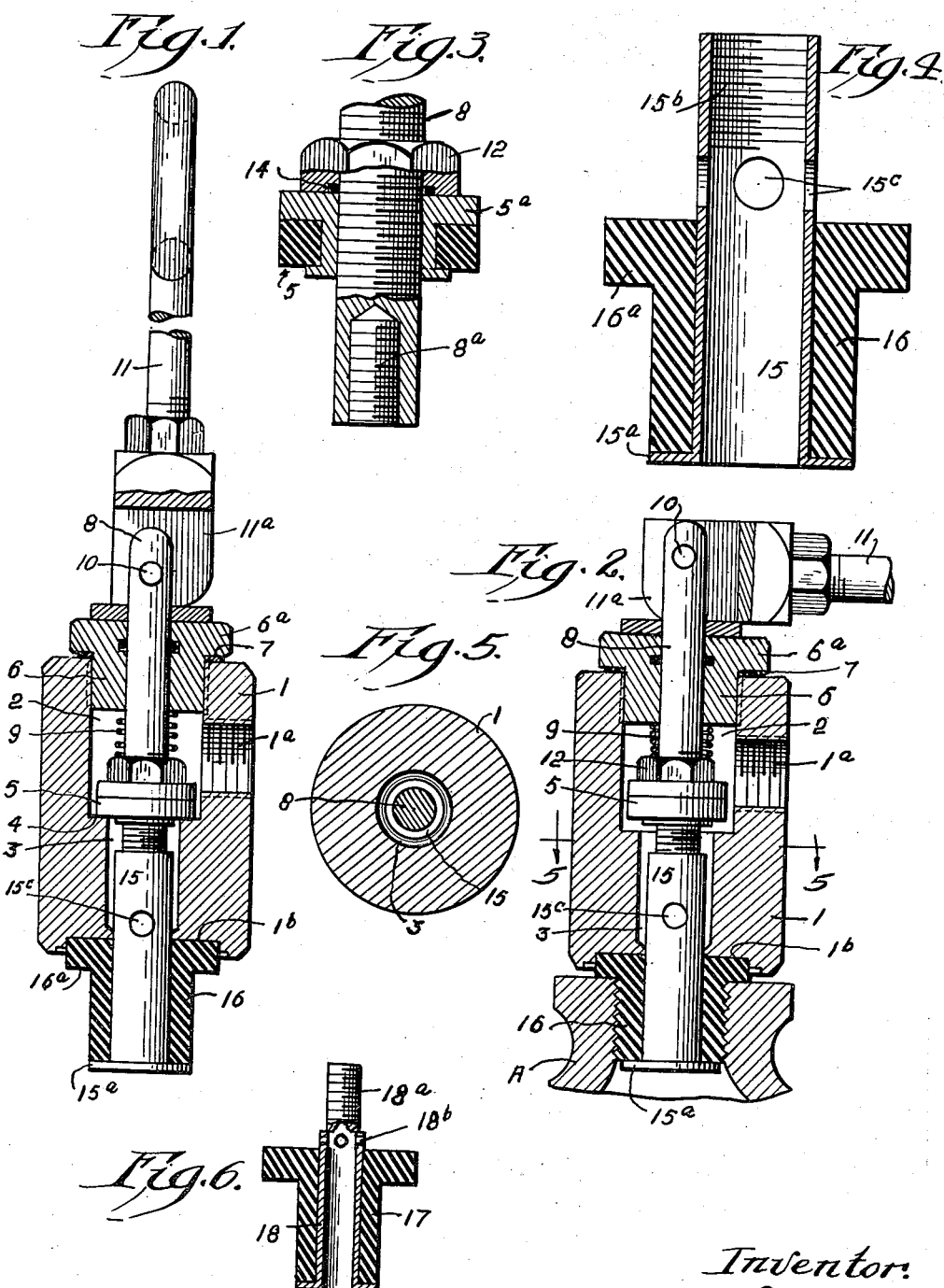
May 17, 1955 — H. F. PRAH — 2,708,588
VALVED TEST PLUG
Filed April 12, 1954
Inventor:
Harry F. Prah
By Wm F Freudenreich
Attorney United States Patent Office 2,708,588
Patented May 17, 1955

VALVED TEST PLUG

Harry F. Prah, Indianapolis, Ind., assignor to Mechanical Products Corporation, a corporation of Illinois Application April 12, 1954, Serial No. 422,450

9 Claims. (Cl. 284—17)

The present invention relates to the art of detecting leaks in apparatuses utilizing fuel gas or other gaseous fluids under moderate pressure, or in fittings associated with such apparatuses; this being accomplished through the introduction of fluid into the inlet for the gaseous fluid to the things to be tested. The fluid for testing purposes may conveniently be introduced through the opening to which the service pipe is intended to be connected; the service pipe being, of course, detached in the case of an installation already in use.

The object of the present invention is to produce a simple and novel device that shall serve both as a connector between a source of gaseous fluid under pressure and an apparatus to be tested and as a valve to open and close the inlet to such apparatus.

In carrying out my invention I utilize a connector, to which such source of fluid under pressure may be coupled, which is provided with a rubber-like plug that may be inserted in the inlet opening of the apparatus to be tested and then be expanded to form a seal around the plug; the plug being constructed to permit fluids to flow axially through the same. Within the connector is a valve that causes the device to serve as a fluid tight stopper while the valve remains closed. A single lever or handle is used to cause the plug to expand laterally and the valve to open when the lever is moved into one position, while allowing the plug to contract again and the valve to close when the lever is moved into a second position.

The various features of novelty whereby the present invention is characterized will hereinafter be pointed out with particularity in the claims; but, for a full understanding of the invention and of its objects and advantages, reference may be had to the following detailed description taken in connection with the accompanying drawing, wherein:

Fig. 1 is a view partly in elevation and partly as an axial section through a device embodying the present invention in a preferred form, with the valve closed;

Fig. 2 is a view, similar to Fig. 1, showing the device locked to an apparatus to be tested, with the valve in its open position;

Fig. 3 is a view, on a larger scale, partly in elevation and partly in longitudinal section, showing the lower end of the valve stem and the valve;

Fig. 4 is an axial section, on the same scale as Fig. 3, through the plug unit detached from the valve stem;

Fig. 5 is a section, similar to Fig. 4, but on the same scale as Fig. 1, through a modified form of the plug unit; and Fig. 6 is an axial section through a modified plug unit.

Referring to the drawing, 1 represents a cylindrical, thick walled, sleeve-like casing having an axial bore the upper part 2 of which is larger in diameter than the lower part 3; there being an upwardly-facing annular shoulder 4 at the juncture of these two parts. This shoulder forms the seat for a valve 5. There is in the wall of the casing a large inlet opening $1^a$ into which may be screwed a connection to a source of supply of gas under pressure.

A metal plug 6 is screwed into and closes the upper end of the bore in the casing; a sealing gasket 7 being interposed between a head or flange $6^a$ on the plug. Extending slidably through plug 6 is a valve stem 8 rising from the valve. A compression spring 9 surrounds the valve stem, resting at its lower end on the valve unit and bearing at its upper end against the under face of plug 6. Therefore the valve is yieldingly held against its seat.

Pivotally connected at one end to the upper end of the valve stem, at 10, is a lever 11. The pivotal end of the lever is a cam $11^a$ which, when the lever stands in the vertical position occupied in Fig. 1, allows the valve to remain seated. But, when the lever is swung into the position shown in Fig. 2, the cam causes the valve stem to be pulled up and the valve to be raised clear of its seat.

The valve is preferably screwed upon the stem to provide for adjustment of the valve and at the same time permitting the stem to extend down from the valve into part 2 of the bore in the casing. As shown in Fig. 3, the lower end of the stem is externally screw-threaded while the valve is internally screw-threaded, in the manner of a nut. A nut 12 on the stem, above the valve proper, serves to lock the valve in any position into which it may be adjusted. A packing ring 14 between the metal part $5^a$ of the valve and the nut prevents leakage along the stem through the joint between the latter and the valve.

A plug device, for closing the lower end of the bore in the casing and forming a coupling between the casing and the thing to be tested, is screwed onto the lower end of the valve stem. This device comprises a tubular element 15 provided at the bottom with an external flange $15^a$, and a rubber-like plug or stopper 16 surrounding the said element and resting on the flange. At the upper end of part 16 is an external, annular flange $16^a$. The upper end of this tubular element is internally screw-threaded, as at $15^b$, for the reception of the lower end of the valve stem. Also, the tubular element contains holes $15^c$ in its wall just above the plug or stopper.

In the final assembly of the parts, the top of plug 16 may bear lightly against the flat bottom face $1^b$ on the thick-walled casing at the time when the valve is closed. Then, when the lever is swung down, the plug device is raised and the rubber like part is compressed in the vertical direction and caused to expand radially or laterally.

In using the device the plug end is set into an inlet opening in the apparatus to be tested, while the parts are in the relative positions illustrated in Fig. 1. The lever is then swung down and the radially expanding plug becomes a sealing fit in such opening. Thus in Fig. 2 it may be assumed that A is part of a globe valve to which a service pipe is connected in any conventional installation. The plug readily enters the screw-threaded hole in member A before expansion but, when compressed in the vertical direction and expanded laterally, as in Fig. 2, becomes interlocked with the screw threads and creates a sealed joint. At the same time flange $16^a$ is tightly clamped between the casing 1 and the top of member A to provide an additional seal.

If a source of supply of gas under pressure was previously connected to the device at inlet opening $1^a$, the upper section 2, of the two-section chamber, is now full of gas; entry of the gas into lower section 3 of such chamber being prevented so long as valve 5 remains closed. Therefore the operation of the lever to lock the device to the apparatus to be tested permits gas to enter the lower chamber section 3 and from there through tubular element 15 into the apparatus to be tested.

Since the openings through which gas must be introduced into apparatuses to be tested vary greatly in size, it is desirable that the plug element be made in several sizes and be interchangeable. Thus the rubber-like part 17 in Fig. 6 is so much smaller in diameter than in the first form, that the tubular element 17 cannot be made large enough to screw onto the valve stem. Therefore the valve stem contains in the lower end a threaded bore 8$^a$, while the upper end 18$^a$ of tubular element 18 is externally screw-threaded for entry into such bore.

When a plug larger than that in Fig. 1 is needed, the upper end of the tubular element may be of the same size as in Figs. 1–4 while the main portion is enlarged so as to avoid excessive thickness of the rubber-like plug member surrounding it.

It will thus be seen that, with the lever in the position it occupies in Fig. 1, the device may remain attached to a flexible hose, for example, and be attached to one apparatus after another for testing them; the act of connecting the device to a piece of apparatus causing the valve to open and admit the testing fluid into such apparatus; while the operation of the lever to uncouple the device again closes the valve and prevents escape of testing fluid before another piece of apparatus is to be tested.

It should also be noted that compensation for wear on the rubber plug and regulation of the degree of compression of the spring are achieved by simply adjusting the tubular element lengthwise of the stem of the valve; the screwthreaded connection between the two latter parts permitting this to be done quickly and easily.

I claim:

1. In a valve device, a single, main casing the interior of which is a chamber formed in two sections, a valve controlling communication between said sections, one chamber section containing an inlet opening, an element fixed to the valve and extending through a wall of the second section of said chamber, said element being constructed to provide at all times an outlet from the latter section, a plug of rubber-like material on the outer end of said element and bearing against the casing, and a stem connected to the valve to open the valve and simultaneously draw the plug against the casing to expand it laterally.

2. In a valve device, a casing containing a chamber formed in two sections, a valve controlling communication between said sections, one chamber section containing an inlet opening, a tubular element fixed to said valve and extending slidably through a wall of the second chamber section, said tubular element containing an opening through its wall at a point within said second chamber section, a plug of rubber-like material surrounding said element outside of and engaged with said wall, and a valve stem aligned with the tubular element and extending through the first chamber section and through a wall of the latter to open the valve and simultaneously draw the plug against the casing to expand it laterally.

3. A valve device as set forth in claim 2, wherein the valve cooperates with a stationary seat in and at right angles to the axis of the casing.

4. In a valve device, a casing containing a chamber formed in two sections with an opening surrounded by a valve seat connecting the sections together, a valve resting on said seat, the chamber section that contains the valve having an inlet, a valve stem extending from the exterior of the casing through the latter chamber section and protruding from the valve into the second chamber section, a tubular element removably connected to the inner end of the stem and extending through a wall of said second chamber section, said element containing a hole in its wall at a point within the latter chamber section, a rubber-like plug supported on the outer end of the said tubular element and engaged with the casing, and means on the outer end of the stem to move it lengthwise to open the valve and draw the plug against the casing to expand the same.

5. A valve device as set forth in claim 4, wherein the inlet is fashioned to effect a coupling between the casing and a source of supply of fluid to be introduced into the chamber in the casing.

6. A valve device as set forth in claim 4, wherein the valve is adjustable along the stem.

7. A valve device as set forth in claim 4, wherein the tubular element is screwed onto the stem so as to be adjustable lengthwise of the same.

8. A valve device as set forth in claim 4, wherein both the valve and the tubular elements are screwed onto and adjustable lengthwise of the stem independently of each other.

9. A valve device as set forth in claim 4, wherein there is within the casing a spring engaged with the valve and tending constantly to hold it against its seat, and wherein the means on the outer end of the stem is a lever pivoted to the stem and provided with a cam engaging the casing for causing the valve to be lifted from its seat when the lever is swung in one direction.

References Cited in the file of this patent

UNITED STATES PATENTS

| | | |
|---|---|---|
| 1,939,978 | Hartman | Dec. 19, 1933 |
| 1,962,740 | Jaworowski | June 12, 1934 |
| 2,444,444 | Anderson | July 6, 1948 |
| 2,444,451 | Kelso | July 6, 1948 |
| 2,484,924 | Anderson | Oct. 18, 1948 |
| 2,672,999 | Protasoff | Mar. 23, 1954 |

FOREIGN PATENTS

| | | |
|---|---|---|
| 676,950 | Great Britain | 1952 |